United States Patent
Ladkat et al.

(10) Patent No.: US 10,870,068 B2
(45) Date of Patent: Dec. 22, 2020

(54) PROCESS AND APPARATUS FOR RECOVERING LIGHT HYDROCARBONS BY SPONGE ABSORPTION

(71) Applicant: UOP LLC, Des Plaines, IL (US)

(72) Inventors: Kiran Ladkat, Gurgaon (IN); Hemant Mahajan, Gurgaon (IN); Neeraj Tiwari, Gurgaon (IN)

(73) Assignee: UOP LLC, Des Plaines, IL (US)

(*) Notice: Subject to any disclaimer, the term of this patent is extended or adjusted under 35 U.S.C. 154(b) by 268 days.

(21) Appl. No.: 15/997,607

(22) Filed: Jun. 4, 2018

(65) Prior Publication Data

US 2018/0280827 A1    Oct. 4, 2018

Related U.S. Application Data

(63) Continuation of application No. PCT/US2016/066813, filed on Dec. 15, 2016.
(Continued)

(51) Int. Cl.
*C01B 3/56* (2006.01)
*B01D 53/14* (2006.01)
(Continued)

(52) U.S. Cl.
CPC .......... *B01D 3/143* (2013.01); *B01D 3/346* (2013.01); *B01D 53/1462* (2013.01); *C01B 3/56* (2013.01);
(Continued)

(58) Field of Classification Search
CPC .... B01D 3/143; B01D 53/1462; B01D 3/346; B01D 2257/702; B01D 2257/108; B01D 2256/24; B01D 2256/16; C10L 3/12;
C10L 3/101; C10L 3/102; C10L 2290/545; C10L 2290/541; C10L 2290/543; C01B 3/56; C01B 2203/065; C01B 2203/0405; C01B 2203/146; C10G 70/041; C10G 49/22

See application file for complete search history.

(56) References Cited

U.S. PATENT DOCUMENTS

| | | | |
|---|---|---|---|
| 2,519,344 A * | 8/1950 | Berg .................... | B01D 53/08 95/112 |
| 3,130,006 A | 4/1964 | Rabo et al. | |

(Continued)

FOREIGN PATENT DOCUMENTS

| WO | 2012074691 A2 | 6/2012 |
|---|---|---|
| WO | 2013028454 A2 | 2/2013 |

OTHER PUBLICATIONS

Indian First Examination Report dated Aug. 22, 2019 for corresponding IN Application No. 201817020114.
(Continued)

*Primary Examiner* — Randy Boyer
*Assistant Examiner* — Juan C Valencia
(74) *Attorney, Agent, or Firm* — Paschall & Associates, LLC; James C. Paschall (57) ABSTRACT

A gas stream comprising LPG and naphtha hydrocarbons is absorbed with a sponge absorbent to recover LPG and naphtha hydrocarbons. The gas stream may comprise stripper off gas and/or PSA tail gas. An absorbent stream may be a stripped stream. The stripper off gas stream and the stripped stream may be obtained from a stripper that is downstream of a hydroprocessing unit.

19 Claims, 3 Drawing Sheets

Related U.S. Application Data (60) Provisional application No. 62/272,505, filed on Dec. 29, 2015.

(51) Int. Cl.
| | | |
|---|---|---|
| *C10L 3/12* | (2006.01) | |
| *C10G 49/22* | (2006.01) | |
| *C10G 70/04* | (2006.01) | |
| *B01D 3/14* | (2006.01) | |
| *B01D 3/34* | (2006.01) | |
| *C10L 3/10* | (2006.01) | |

(52) U.S. Cl.
CPC ............... *C10L 3/101* (2013.01); *C10L 3/12* (2013.01); *B01D 2256/16* (2013.01); *B01D 2256/24* (2013.01); *B01D 2257/108* (2013.01); *B01D 2257/702* (2013.01); *C01B 2203/0405* (2013.01); *C01B 2203/065* (2013.01); *C01B 2203/146* (2013.01); *C10G 49/22* (2013.01); *C10G 70/041* (2013.01); *C10L 3/102* (2013.01); *C10L 2290/541* (2013.01); *C10L 2290/543* (2013.01); *C10L 2290/545* (2013.01)

(56) References Cited

U.S. PATENT DOCUMENTS

| | | | |
|---|---|---|---|
| 3,430,418 A | | 3/1969 | Wagner |
| 3,753,892 A | | 8/1973 | Weith |
| 4,067,921 A | * | 1/1978 | Helberg ............... C07C 5/42 585/252 |
| 4,363,718 A | | 12/1982 | Klotz |
| 4,743,356 A | * | 5/1988 | Soderberg ............ C10G 47/30 208/101 |
| 5,258,117 A | | 11/1993 | Kolstad et al. |
| 5,453,177 A | | 9/1995 | Goebel et al. |
| 9,084,945 B2 | | 7/2015 | Hoehn et al. |
| 2007/0017155 A1 | | 1/2007 | Al-Babtain |
| 2008/0141860 A1 | * | 6/2008 | Morgan ............... C01B 3/38 95/96 |
| 2015/0053590 A1 | | 2/2015 | Ladkat et al. |

OTHER PUBLICATIONS

PCT Search Report dated Mar. 23, 2017 for corresponding PCT Application No. PCT/US2016/066813.

* cited by examiner

PROCESS AND APPARATUS FOR RECOVERING LIGHT HYDROCARBONS BY SPONGE ABSORPTION

CROSS-REFERENCE TO RELATED APPLICATIONS

This application is a Continuation of International Application No. PCT/US2016/066813 filed Dec. 15, 2016, which application claims priority from U.S. Provisional Application No. 62/272,505 filed Dec. 29, 2015, the contents of which cited applications are hereby incorporated by reference in their entirety.

FIELD

The field is the recovery of hydrogen and light hydrocarbons particularly from hydroprocessed streams.

BACKGROUND

Hydroprocessing can include processes which convert hydrocarbons in the presence of hydroprocessing catalyst and hydrogen to more valuable products.

Hydrocracking is a hydroprocessing process in which hydrocarbons crack in the presence of hydrogen and hydrocracking catalyst to lower molecular weight hydrocarbons. Depending on the desired output, a hydrocracking unit may contain one or more fixed beds of the same or different catalyst. Slurry hydrocracking is a slurried catalytic process used to crack residue feeds to gas oils and fuels.

Due to environmental concerns and newly enacted rules and regulations, saleable fuels must meet lower and lower limits on contaminates, such as sulfur and nitrogen. New regulations require essentially complete removal of sulfur from diesel. For example, the ultra low sulfur diesel (ULSD) requirement is typically less than about 10 wppm sulfur.

Hydrotreating is a hydroprocessing process used to remove heteroatoms such as sulfur and nitrogen from hydrocarbon streams to meet fuel specifications and to saturate olefinic or aromatic compounds. Hydrotreating can be performed at high or low pressures, but is typically operated at lower pressure than hydrocracking.

Hydroprocessing recovery units typically include an array of separators for cooling and depressurizing hydroprocessed effluent and separating gaseous streams from liquid streams and a stripping column for stripping hydroprocessed liquid with a stripping medium such as steam to remove unwanted hydrogen sulfide. The stripped stream then is typically heated and fractionated in a product fractionation column to recover products such as naphtha, kerosene and diesel.

In a refinery, hydrogen has a prime importance and recovery of hydrogen improves refinery profitability significantly. Pressure swing absorption (PSA) units are useful for purifying hydrogen by adsorbing larger molecules from the hydrogen stream at high pressure and then releasing the larger molecules at swing to lower pressure to provide a tail gas stream.

In many regions liquefied petroleum gas (LPG) is also important for petrochemical and fuel uses and additional recovery of LPG can also boost profit. Naphtha is also useful for fuel and petrochemical feed stock and its further recovery is desirable.

There is a continuing need, therefore, for improved methods of recovering hydrogen, LPG and naphtha from hydroprocessed effluent streams.

BRIEF SUMMARY

We have found that hydrogen loss from cold flash and hot flash liquid streams in a separation section can typically be 2 to 3 wt % of the hydrogen consumption in a hydroprocessing unit. Additionally, cold flash gaseous streams typically comprise 15-20 wt % of the LPG produced in the hydroprocessing unit. The process and apparatus are designed to recover these valuable components.

A gas stream comprising LPG and naphtha hydrocarbons is absorbed with a sponge absorbent to recover LPG and naphtha hydrocarbons. The gas stream may comprise stripper off gas and/or PSA tail gas. An absorbent stream may be a stripped stream.

DEFINITIONS

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without undergoing a compositional change due to physical fractionation or chemical conversion.

The term "bypass" means that the object is out of downstream communication with a bypassing subject at least to the extent of bypassing.

As used herein, the term "a component-rich stream" means that the rich stream coming out of a vessel has a greater concentration of the component than the feed to the vessel.

As used herein, the term "a component-lean stream" means that the lean stream coming out of a vessel has a smaller concentration of the component than the feed to the vessel.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Absorber and scrubbing columns do not include a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The overhead pressure is the pressure of the overhead vapor at the vapor outlet of the column. The bottom temperature is the liquid bottom outlet temperature. Overhead lines and bottoms lines refer to the net lines from the column downstream of any reflux or reboil to the column unless otherwise indicated. Stripping columns omit a reboiler at a bottom of the column and instead provide heating requirements and separation impetus from a fluidized inert media such as steam.

As used herein, the term "True Boiling Point" (TBP) means a test method for determining the boiling point of a material which corresponds to ASTM D-2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

As used herein, the term "T5" or "T95" means the temperature at which 5 volume percent or 95 volume percent, as the case may be, respectively, of the sample boils using ASTM D-86.

As used herein, the term "diesel cut point" is between about 343° C. (650° F.) and about 399° C. (750° F.) using the TBP distillation method.

As used herein, the term "diesel boiling range" means hydrocarbons boiling in the range of between about 132° C. (270° F.) and the diesel cut point using the TBP distillation method.

As used herein, the term "diesel conversion" means conversion of feed to material that boils at or below the diesel cut point of the diesel boiling range.

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator which latter may be operated at higher pressure.

As used herein, the term "predominant" or "predominate" means greater than 50%, suitably greater than 75% and preferably greater than 90%.

DETAILED DESCRIPTION

In hydroprocessing units, hydrogen loss may be attributed to solution losses in hot separator liquid and cold separator liquid streams. Hydrogen from a cold flash drum vapor stream may be recovered in hydrogen recovery systems which may include a (PSA) unit. However hydrogen contained in hot flash and cold flash liquid streams can go into a stripper column and subsequently into the overhead off gas stream from the process unit. The stripper off gas stream is typically blended into the refinery fuel gas and burned. Hence, recovering hydrogen from the hot flash and cold flash liquid streams can reduce overall hydrogen consumption.

We have found that the bulk of the hydrogen is contained in the hot flash liquid stream and the bulk of the LPG is contained in the cold flash liquid stream. The cold flash drum gaseous stream typically contains 15-20 wt % of the hydroprocessed LPG based on reactor yields. LPG lost from the cold flash drum gaseous stream can be recovered as discovered. Moreover, we have found PSA tail gas contains LPG and naphtha hydrocarbons that can be recovered economically.

Figure 1:
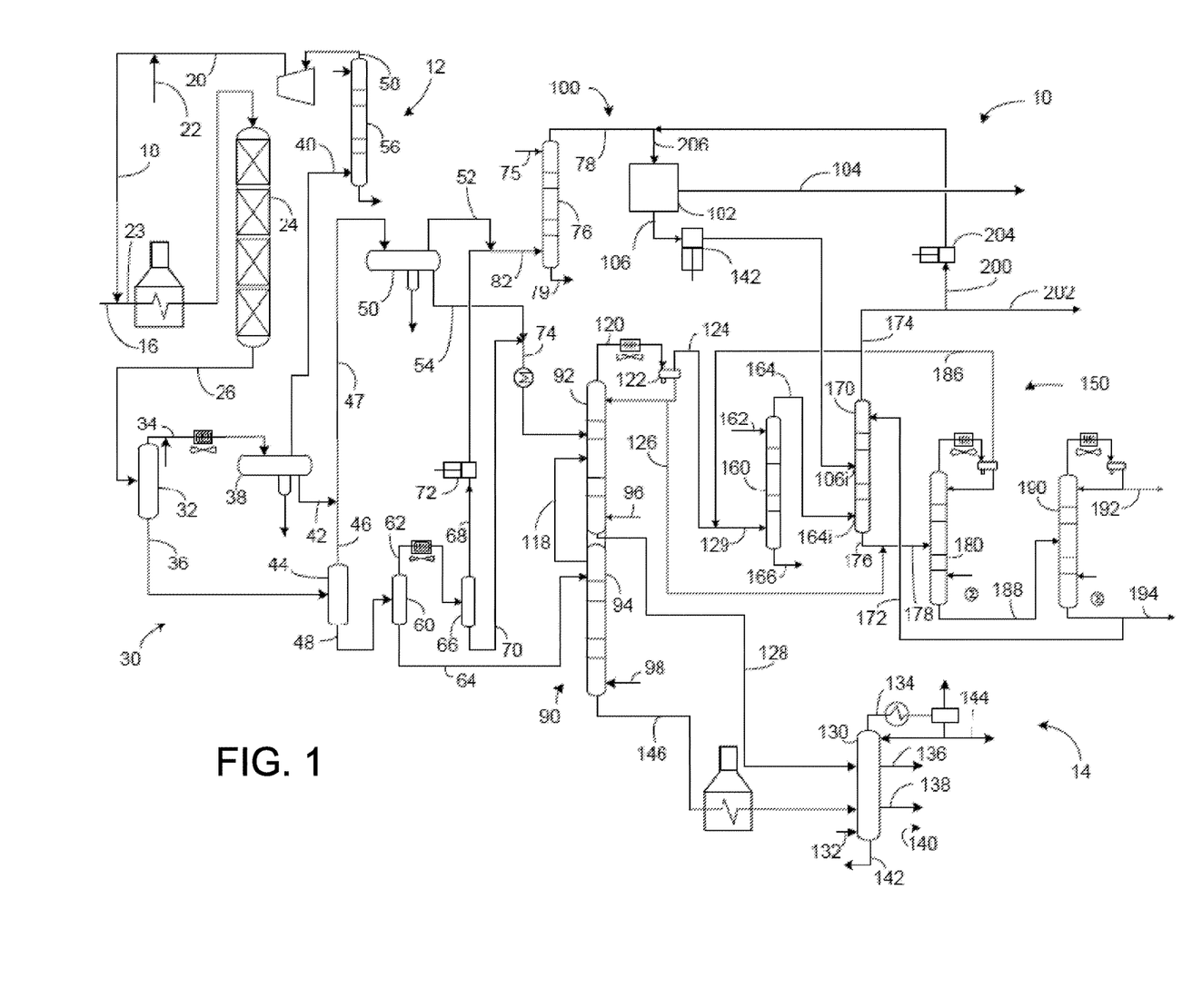
FIG. 1 is a simplified process flow diagram.

The apparatus and process 10 for hydroprocessing hydrocarbons comprise a hydroprocessing unit 12, a separation section 30, a hydrogen recovery unit 100, a LPG recovery section 150 and a product recovery unit 14. A hydrocarbonaceous stream in hydrocarbon line 16 and a hydrogen stream in hydrogen line 18 are fed to the hydroprocessing unit 12.

A recycle hydrogen stream in recycle hydrogen line 20 may be supplemented by a make-up hydrogen stream from line 22 to provide the hydrogen stream in hydrogen line 18. The hydrogen stream may join the hydrocarbonaceous stream in feed line 16 to provide a hydrocarbon feed stream in feed line 23. The hydrocarbon feed stream in line 23 may be heated in a fired heater and fed to the hydroprocessing reactor 24. The hydrocarbon feed stream is hydroprocessed in the hydroprocessing reactor 24.

In one aspect, the process and apparatus described herein are particularly useful for hydroprocessing a hydrocarbon feed stream comprising a hydrocarbonaceous feedstock. Illustrative hydrocarbon feedstocks include hydrocarbonaceous streams having initial boiling points (IBP) above about 288° C. (550° F.), such as atmospheric gas oils, vacuum gas oil (VGO) having T5 and T95 between about 315° C. (600° F.) and about 600° C. (1100° F.), deasphalted oil, coker distillates, straight run distillates, pyrolysis-derived oils, high boiling synthetic oils, cycle oils, hydrocracked feeds, catalytic cracker distillates, atmospheric residue having an IBP at or above about 343° C. (650° F.) and vacuum residue having an IBP above about 510° C. (950° F.).

Hydroprocessing that occurs in the hydroprocessing unit 12 may be hydrocracking or hydrotreating. Hydrocracking refers to a process in which hydrocarbons crack in the presence of hydrogen to lower molecular weight hydrocarbons. Hydrocracking is the preferred process in the hydroprocessing unit 12. Consequently, the term "hydroprocessing" will include the term "hydrocracking" herein. Hydrocracking also includes slurry hydrocracking in which resid feed is mixed with catalyst and hydrogen to make a slurry and cracked to lower boiling products.

Hydroprocessing that occurs in the hydroprocessing unit may also be hydrotreating. Hydrotreating is a process wherein hydrogen is contacted with hydrocarbon in the presence of suitable catalysts which are primarily active for the removal of heteroatoms, such as sulfur, nitrogen and metals from the hydrocarbon feedstock. In hydrotreating, hydrocarbons with double and triple bonds may be saturated. Aromatics may also be saturated. Some hydrotreating processes are specifically designed to saturate aromatics. The cloud point or pour point of the hydrotreated product may also be reduced by hydroisomerization. A hydrocracking reactor may be preceded by a hydrotreating reactor and a separator (not shown) to remove sulfur and nitrogen contaminants from the feed to the hydrocracking reactor.

The hydroprocessing reactor 24 may be a fixed bed reactor that comprises one or more vessels, single or multiple beds of catalyst in each vessel, and various combinations of hydrotreating catalyst and/or hydrocracking catalyst in one or more vessels. It is contemplated that the hydroprocessing reactor 24 be operated in a continuous liquid phase in which the volume of the liquid hydrocarbon feed is greater than the volume of the hydrogen gas. The hydroprocessing reactor 24 may also be operated in a conventional continuous gas phase, a moving bed or a fluidized bed hydroprocessing reactor.

If the hydroprocessing reactor 24 is operated as a hydrocracking reactor, it may provide total conversion of at least about 20 vol % and typically greater than about 60 vol % of the hydrocarbon feed to products boiling below the diesel cut point. A hydrocracking reactor may operate at partial conversion of more than about 30 vol % or full conversion of at least about 90 vol % of the feed based on total conversion. A hydrocracking reactor may be operated at mild hydrocracking conditions which will provide about 20 to about 60 vol %, preferably about 20 to about 50 vol %, total conversion of the hydrocarbon feed to product boiling below the diesel cut point. If the hydroprocessing reactor 24 is operated as a hydrotreating reactor, it may provide conversion per pass of about 10 to about 30 vol %.

If the hydroprocessing reactor 24 is a hydrocracking reactor, the first vessel or bed in the hydrocracking reactor 24 may include hydrotreating catalyst for the purpose of saturating, demetallizing, desulfurizing or denitrogenating the hydrocarbon feed before it is hydrocracked with hydrocracking catalyst in subsequent vessels or beds in the hydrocracking reactor 24. If the hydrocracking reactor is a mild hydrocracking reactor, it may contain several beds of hydrotreating catalyst followed by a fewer beds of hydrocracking catalyst. If the hydroprocessing reactor 24 is a slurry hydrocracking reactor, it may operate in a continuous liquid phase in an upflow mode and will appear different than in FIG. 1 which depicts a fixed bed reactor. If the hydroprocessing reactor 24 is a hydrotreating reactor it may comprise more than one vessel and multiple beds of hydrotreating catalyst. The hydrotreating reactor may also contain hydrotreating catalyst that is suited for saturating aromatics, hydrodewaxing and hydroisomerization.

A hydrocracking catalyst may utilize amorphous silica-alumina bases or low-level zeolite bases combined with one or more Group VIII or Group VIB metal hydrogenating components if mild hydrocracking is desired to produce a balance of middle distillate and gasoline. In another aspect, when middle distillate is significantly preferred in the converted product over gasoline production, partial or full hydrocracking may be performed in the first hydrocracking reactor 24 with a catalyst which comprises, in general, any crystalline zeolite cracking base upon which is deposited a Group VIII metal hydrogenating component. Additional hydrogenating components may be selected from Group VIB for incorporation with the zeolite base.

The zeolite cracking bases are sometimes referred to in the art as molecular sieves and are usually composed of silica, alumina and one or more exchangeable cations such as sodium, magnesium, calcium, rare earth metals, etc. They are further characterized by crystal pores of relatively uniform diameter between about 4 and about 14 Angstroms ($10^{-10}$ meters). It is preferred to employ zeolites having a relatively high silica/alumina mole ratio between about 3 and about 12. Suitable zeolites found in nature include, for example, mordenite, stilbite, heulandite, ferrierite, dachiardite, chabazite, erionite and faujasite. Suitable synthetic zeolites include, for example, the B, X, Y and L crystal types, e.g., synthetic faujasite and mordenite. The preferred zeolites are those having crystal pore diameters between about 8 and 12 Angstroms ($10^{-10}$ meters), wherein the silica/alumina mole ratio is about 4 to 6. One example of a zeolite falling in the preferred group is synthetic Y molecular sieve.

The natural occurring zeolites are normally found in a sodium form, an alkaline earth metal form, or mixed forms. The synthetic zeolites are nearly always prepared first in the sodium form. In any case, for use as a cracking base it is preferred that most or all of the original zeolitic monovalent metals be ion-exchanged with a polyvalent metal and/or with an ammonium salt followed by heating to decompose the ammonium ions associated with the zeolite, leaving in their place hydrogen ions and/or exchange sites which have actually been decationized by further removal of water. Hydrogen or "decationized" Y zeolites of this nature are more particularly described in U.S. Pat. No. 3,130,006.

Mixed polyvalent metal-hydrogen zeolites may be prepared by ion-exchanging first with an ammonium salt, then partially back exchanging with a polyvalent metal salt and then calcining. In some cases, as in the case of synthetic mordenite, the hydrogen forms can be prepared by direct acid treatment of the alkali metal zeolites. In one aspect, the preferred cracking bases are those which are at least about 10 percent, and preferably at least about 20 percent, metal-cation-deficient, based on the initial ion-exchange capacity. In another aspect, a desirable and stable class of zeolites is one wherein at least about 20 percent of the ion exchange capacity is satisfied by hydrogen ions.

The active metals employed in the preferred hydrocracking catalysts of the present invention as hydrogenation components are those of Group VIII, i.e., iron, cobalt, nickel, ruthenium, rhodium, palladium, osmium, iridium and platinum. In addition to these metals, other promoters may also be employed in conjunction therewith, including the metals of Group VIB, e.g., molybdenum and tungsten. The amount of hydrogenating metal in the catalyst can vary within wide ranges. Broadly speaking, any amount between about 0.05 percent and about 30 percent by weight may be used. In the case of the noble metals, it is normally preferred to use about 0.05 to about 2 wt % noble metal.

The method for incorporating the hydrogenating metal is to contact the base material with an aqueous solution of a suitable compound of the desired metal wherein the metal is present in a cationic form. Following addition of the selected hydrogenating metal or metals, the resulting catalyst powder is then filtered, dried, pelleted with added lubricants, binders or the like if desired, and calcined in air at temperatures of, e.g., about 371° C. (700° F.) to about 648° C. (1200° F.) in order to activate the catalyst and decompose ammonium ions. Alternatively, the base component may first be pelleted, followed by the addition of the hydrogenating component and activation by calcining.

The foregoing catalysts may be employed in undiluted form, or the powdered catalyst may be mixed and copelleted with other relatively less active catalysts, diluents or binders such as alumina, silica gel, silica-alumina cogels, activated clays and the like in proportions ranging between about 5 and about 90 wt %. These diluents may be employed as such or they may contain a minor proportion of an added hydrogenating metal such as a Group VIB and/or Group VIII metal. Additional metal promoted hydrocracking catalysts may also be utilized in the process of the present invention which comprises, for example, aluminophosphate molecular sieves, crystalline chromosilicates and other crystalline silicates. Crystalline chromosilicates are more fully described in U.S. Pat. No. 4,363,718.

By one approach, the hydrocracking conditions may include a temperature from about 290° C. (550° F.) to about 468° C. (875° F.), preferably 343° C. (650° F.) to about 445° C. (833° F.), a pressure from about 4.8 MPa (gauge) (700 psig) to about 20.7 MPa (gauge) (3000 psig), a liquid hourly space velocity (LHSV) from about 0.4 to less than about 2.5 $hr^{-1}$ and a hydrogen rate of about 421 (2,500 scf/bbl) to about 2,527 $Nm^3/m^3$ oil (15,000 scf/bbl). If mild hydrocracking is desired, conditions may include a temperature from about 315° C. (600° F.) to about 441° C. (825° F.), a pressure from about 5.5 MPa (gauge) (800 psig) to about 13.8 MPa (gauge) (2000 psig) or more typically about 6.9 MPa (gauge) (1000 psig) to about 11.0 MPa (gauge) (1600 psig), a liquid hourly space velocity (LHSV) from about 0.5 to about 2 $hr^{-1}$ and preferably about 0.7 to about 1.5 $hr^{-1}$ and a hydrogen rate of about 421 $Nm^3/m^3$ oil (2,500 scf/bbl) to about 1,685 $Nm^3/m^3$ oil (10,000 scf/bbl).

Suitable hydrotreating catalysts for use in the present invention are any known conventional hydrotreating catalysts and include those which are comprised of at least one Group VIII metal, preferably iron, cobalt and nickel, more preferably cobalt and/or nickel and at least one Group VI metal, preferably molybdenum and tungsten, on a high surface area support material, preferably alumina. Other suitable hydrotreating catalysts include zeolitic catalysts, as well as noble metal catalysts where the noble metal is selected from palladium and platinum. It is within the scope of the present description that more than one type of hydrotreating catalyst be used in the same hydrotreating reactor 24. The Group VIII metal is typically present in an amount ranging from about 2 to about 20 wt %, preferably from about 4 to about 12 wt %. The Group VI metal will typically be present in an amount ranging from about 1 to about 25 wt %, preferably from about 2 to about 25 wt %.

Preferred hydrotreating reaction conditions include a temperature from about 290° C. (550° F.) to about 455° C. (850° F.), suitably 316° C. (600° F.) to about 427° C. (800° F.) and preferably 343° C. (650° F.) to about 399° C. (750° F.), a pressure from about 2.1 MPa (gauge) (300 psig), preferably 4.1 MPa (gauge) (600 psig) to about 20.6 MPa (gauge) (3000 psig), suitably 12.4 MPa (gauge) (1800 psig), preferably 6.9 MPa (gauge) (1000 psig), a liquid hourly space velocity of the fresh hydrocarbonaceous feedstock from about $0.1\ hr^{-1}$, suitably $0.5\ hr^{-1}$, to about $4\ hr^{-1}$, preferably from about 1.5 to about $3.5\ hr^{-1}$, and a hydrogen rate of about 168 $Nm^3/m^3$ (1,000 scf/bbl), to about 1,011 $Nm^3/m^3$ oil (6,000 scf/bbl), preferably about 168 $Nm^3/m^3$ oil (1,000 scf/bbl) to about 674 $Nm^3/m^3$ oil (4,000 scf/bbl), with a hydrotreating catalyst or a combination of hydrotreating catalysts.

The hydroprocessing reactor 24 provides a hydroprocessing effluent stream that exits the hydroprocessing reactor 24 in a hydroprocessing effluent line 26. The hydroprocessing effluent stream comprises material that will be separated in the separation section 30 comprising one or more separators into a liquid hydroprocessed stream and a gaseous hydroprocessed stream. The separation section 30 is in downstream communication with the hydroprocessing reactor 24.

The hydroprocessing effluent stream in hydroprocessing effluent line 26 may in an aspect be heat exchanged with the hydrocarbon feed stream in line 16 to be cooled before entering a hot separator 32. The hot separator separates the hydroprocessing effluent to provide a hydrocarbonaceous, gaseous hot gaseous stream in an overhead line 34 and a hydrocarbonaceous hot liquid stream in a bottoms line 36. The hot separator 32 may be in downstream communication with the hydroprocessing reactor 24. The hot separator 32 operates at about 177° C. (350° F.) to about 371° C. (700° F.) and preferably operates at about 232° C. (450° F.) to about 315° C. (600° F.). The hot separator 32 may be operated at a slightly lower pressure than the hydroprocessing reactor 24 accounting for pressure drop through intervening equipment. The hot separator may be operated at pressures between about 3.4 MPa (gauge) (493 psig) and about 20.4 MPa (gauge) (2959 psig). The liquid hydrocarbonaceous hot liquid stream 36 may have a temperature of the operating temperature of the hot separator 32.

The hot gaseous stream in the overhead line 34 may be cooled before entering a cold separator 38. As a consequence of the reactions taking place in the hydroprocessing reactor 24 wherein nitrogen, chlorine and sulfur are removed from the feed, ammonia and hydrogen sulfide are formed. At a characteristic sublimation temperature, ammonia and hydrogen sulfide will combine to form ammonium bisulfide and ammonia and chlorine will combine to form ammonium chloride. Each compound has a characteristic sublimation temperature that may allow the compound to coat equipment, particularly heat exchange equipment, impairing its performance. To prevent such deposition of ammonium bisulfide or ammonium chloride salts in the line 34 transporting the hot gaseous stream, a suitable amount of wash water may be introduced into line 34 upstream of a cooler at a point in line 34 where the temperature is above the characteristic sublimation temperature of either compound.

The cold gaseous stream may be separated in the cold separator 38 to provide a vaporous cold gaseous stream comprising a hydrogen-rich gas stream in an overhead line 40 and a liquid cold liquid stream in a cold bottoms line 42. The cold separator 38 serves to separate hydrogen from hydrocarbon in the hydroprocessing effluent for recycle to the hydroprocessing reactor 24 in the cold overhead line 40. The cold separator 38, therefore, is in downstream communication with the overhead line 34 of the hot separator 32 and the hydroprocessing reactor 24. The cold separator 38 may be operated at about 100° F. (38° C.) to about 150° F. (66° C.), suitably about 115° F. (46° C.) to about 145° F. (63° C.), and just below the pressure of the hydroprocessing reactor 24 and the hot separator 32 accounting for pressure drop through intervening equipment to keep hydrogen and light gases in the overhead and normally liquid hydrocarbons in the bottoms. The cold separator 38 may be operated at pressures between about 3 MPa (gauge) (435 psig) and about 20 MPa (gauge) (2,901 psig). The cold separator 38 may also have a boot for collecting an aqueous phase. The cold liquid stream may have a temperature of the operating temperature of the cold separator 38.

The cold gaseous stream in the cold overhead line 40 is rich in hydrogen. Thus, hydrogen can be recovered from the cold gaseous stream. The cold gaseous stream in the cold overhead line 40 may be passed through a trayed or packed recycle scrubbing column 56 where it is scrubbed by means of a scrubbing extraction liquid such as an aqueous amine solution to remove acid gases including hydrogen sulfide and carbon dioxide by extracting them into the aqueous solution. Preferred lean amines include alkanolamines DEA, MEA, and MDEA. Other amines can be used in place of or in addition to the preferred amines. The lean amine contacts the cold gaseous stream and absorbs acid gas contaminants such as hydrogen sulfide and carbon dioxide. The resultant "sweetened" cold gaseous stream is taken out from an overhead outlet of the recycle scrubber column 56 in a recycle scrubber overhead line 58, and a rich amine is taken out from the bottoms at a bottom outlet of the recycle scrubber column in a recycle scrubber bottoms line. The spent scrubbing liquid from the bottoms may be regenerated and recycled back to the recycle scrubbing column 56. The scrubbed hydrogen-rich stream emerges from the scrubber via an overhead line 58 and may be compressed in a recycle compressor to provide a recycle hydrogen stream in line 20. The recycle hydrogen stream in line 20 may be supplemented with make-up hydrogen stream in make-up line 22 to provide the hydrogen stream in hydrogen line 18. A portion of the material in line 20 may be routed to the intermediate catalyst bed outlets in the hydroprocessing reactor 24 to control the inlet temperature of the subsequent catalyst bed (not shown). The recycle scrubbing column 56 may be operated with a gas inlet temperature between about 38° C. (100° F.) and about 66° C. (150° F.) and an overhead pressure of about 3 MPa (gauge) (435 psig) to about 20 MPa (gauge) (2900 psig).

The hydrocarbonaceous hot liquid stream in the hot bottoms line 36 may be fractionated as a hot hydroprocessing effluent stream in the product recovery unit 14. In an aspect, the hot liquid stream in the bottoms line 36 may be let down in pressure and flashed in a hot flash drum 44 to provide a hot flash gaseous stream of light ends in an overhead line 46 and a hot flash liquid stream in a hot flash bottoms line 48. The hot flash drum 44 may be any separator that splits the liquid hydroprocessing effluent into vapor and liquid fractions. The hot flash drum 44 may be in downstream communication with the hot bottoms line 36. The hot flash drum 44 may be operated at the same temperature as the hot separator 32 but at a lower pressure of between about 1.4 MPa (gauge) (200 psig) and about 6.9 MPa (gauge) (1000 psig), suitably no more than about 3.4 MPa (gauge) (500 psig). The hot flash liquid stream in bottoms line 48 may be further fractionated in the product recovery unit 14. The hot flash liquid stream in the hot flash bottoms line 48 may have a temperature of the operating temperature of the hot flash drum 44.

In an aspect, the cold liquid stream in the cold bottoms line 42 may be fractionated as a cold hydroprocessing effluent stream in the product recovery unit 14. In a further aspect, the cold liquid stream may be let down in pressure and flashed in a cold flash drum 50 to separate the cold liquid stream in the bottoms line 42. The cold flash drum 50 may be any separator that splits hydroprocessing effluent into vapor and liquid fractions. The cold flash drum may be in downstream communication with a bottoms line 42 of the cold separator 38.

In a further aspect, the hot flash gaseous stream in the hot flash overhead line 46 may be fractionated as a hot hydroprocessing effluent stream in the product recovery unit 14. In a further aspect, the hot flash gaseous stream may be cooled and also separated in the cold flash drum 50. The cold flash drum 50 may separate the cold liquid stream in line 42 and the hot flash gaseous stream in overhead line 46 to provide a cold flash gaseous stream in overhead line 52 and a cold flash liquid stream in a bottoms line 54. In an aspect, light gases such as hydrogen sulfide may be stripped from the cold flash liquid stream. Accordingly, a cold stripping column 92 may be in downstream communication with the cold flash drum 50 and the cold flash bottoms line 54. The cold flash drum 50 may be in downstream communication with the bottoms line 42 of the cold separator 38, the overhead line 46 of the hot flash drum 44 and the hydroprocessing reactor 24. The cold liquid stream in cold bottoms line 42 and the hot flash gaseous stream in the hot flash overhead line 46 may enter into the cold flash drum 50 either together or separately. In an aspect, the hot flash overhead line 46 joins the cold bottoms line 42 and feeds the hot flash gaseous stream and the cold liquid stream together to the cold flash drum 50 in line 47. The cold flash drum 50 may be operated at the same temperature as the cold separator 38 but typically at a lower pressure of between about 1.4 MPa (gauge) (200 psig) and about 6.9 MPa (gauge) (1000 psig) and preferably no higher than 3.1 MPa (gauge) (450 psig). A flashed aqueous stream may be removed from a boot in the cold flash drum 50. The cold flash liquid stream in the cold flash bottoms line 54 may have the same temperature as the operating temperature of the cold flash drum 50. The cold flash gaseous stream in the cold flash overhead line 52 contains substantial hydrogen and may be transported to the hydrogen recovery unit 100 for recovering hydrogen from the cold flash gaseous stream.

We have found that substantial hydrogen may be dissolved in the hot flash liquid stream in the hot flash bottoms line 48, more than in the cold flash liquid stream tine the cold flash bottoms line 42, which can be lost in the stripper off gas. Hence, we propose to recover hydrogen from the hot flash liquid stream in a hydrogen recovery unit 100. The hot flash liquid stream in the hot flash bottoms line 48 is separated in a medium pressure separator 60 to provide a medium gaseous stream in a medium overhead line 62 and a medium liquid stream in medium bottoms line 64. The medium pressure separator 60 may be in downstream communication with the hot flash bottoms line 48 and the hydrogen recovery unit 100 may be in downstream communication with the medium overhead line 62 of the medium pressure separator 60. The medium pressure separator 60 may be operated at the same temperature as the hot flash drum 44 but typically at a lower pressure of between about 0.97 MPa (gauge) (140 psig) and about 1.59 MPa (gauge) (230 psig) and preferably no higher than 1.38 MPa (gauge) (200 psig). Hydrogen may be recovered from the medium gaseous stream in the hydrogen recovery unit 100. Moreover, the medium liquid stream may be stripped in a stripper column 90. The stripper column 90 may comprise a cold stripper 92 and a hot stripper 94. The medium liquid stream in the medium bottoms line 64 may be stripped in the hot stripper 94.

In a further embodiment, to further remove liquid hydrocarbons from the medium gaseous stream, the medium gaseous stream in the medium overhead line 62 may be flashed in a medium pressure flash drum 66 to provide a medium flash gaseous stream in medium flash overhead line 68 and a medium flash liquid stream in a medium flash bottoms line 70. The medium flash drum may be in downstream communication with a medium pressure overhead line 62. The hydrogen recovery unit 100 may be in downstream communication with an overhead line 68 of the medium pressure flash drum 66. In an aspect, the medium gaseous stream may be cooled before separation in said medium pressure flash drum 66. The medium pressure flash drum 66 may be operated at the same pressure as the medium pressure separator 60 but typically at a temperature of between about 40° C. and about 60° C. The medium pressure flash drum should be operated at a pressure of about 140 kPa (20 psi) to about 410 kPa (60 psi) above that of the stripper column 90. The medium flash gaseous stream may be transported to the hydrogen recovery unit 100. The medium flash liquid stream in the medium flash bottoms line 70 may be stripped in the stripper column 90. In an aspect, the medium flash liquid stream may be heated and may be stripped in the cold stripper column 92. In a further aspect, the medium flash liquid stream in the medium flash bottoms line 70 may be mixed with the cold flash liquid stream in the cold flash bottoms line 54 and a compressed, condensed stream in a knock out bottoms line 207. The mixed stream in mixed line 74 may be heated together and stripped in the cold stripper column 92.

In an aspect, the medium flash gaseous stream may be compressed in a separator compressor 72 to the hydrogen recovery pressure of about 1.4 MPa (gauge) (200 psig) to about 3.1 MPa (gauge) (450 psig) to provide a compressed medium gaseous stream in route to the hydrogen recovery unit 100. The compressed, medium gaseous stream may be fed from the separator compressor 72 to a compressor knock out drum 71 to remove a compressed, condensed stream in a medium knockout bottoms line 73 for transport to the stripper column 90. The knock out drum 71 may be in downstream communication with the separator compressor 72. The medium knockout bottoms line 73 may transport a medium knockout liquid stream to be mixed with the medium flash liquid stream in a medium flash bottoms line 70 for transport to the stripper column 90. The remaining compressed, medium gaseous stream may be transported from the knock out drum 71 to the hydrogen recovery unit 100 in a medium knock out overhead line 77. The compressed, medium gaseous stream in the medium knockout overhead line 77 comprises substantial hydrogen such as about 70 to about 90 mole % which may transported to the hydrogen recovery unit 100 for hydrogen recovery. In an aspect, the cold flash gaseous stream in the cold flash overhead line 52 may be mixed with said medium vapor stream perhaps after compression to the cold flash drum pressure and transported to the hydrogen recovery unit 100.

The compressed, medium gaseous stream in the medium knockout overhead line 77 may be passed through a trayed or packed separator scrubbing column 76 in the hydrogen recovery unit 100. Alternatively or conjunctively, the cold flash gaseous stream in the cold flash overhead line 52 may be passed through a trayed or packed separator scrubbing column 76 in the hydrogen recovery unit 100. In an aspect, the compressed, medium gaseous stream in medium knock-out overhead line 77 may be combined with the cold flash gaseous stream and fed to the hydrogen recovery unit 100 together in a joint line 82 as a joint gaseous stream. In the separator scrubbing column 76, the gaseous stream is scrubbed by means of a scrubbing extraction liquid such as an aqueous amine solution to remove acid gases including hydrogen sulfide and carbon dioxide by extracting them into the aqueous amine solution. The gaseous stream enters the separator scrubbing column 76 at an inlet near a bottom and flows upwardly, while a lean amine stream in a solvent line 75 enters the scrubber column at an inlet near a top and flows downwardly. Preferred lean amines include alkanolamines diethanolamine (DEA), monoethanolamine (MEA), and methyldiethanolamine (MDEA). However, other amines or solvents can be used. The lean amine stream contacts the scrubbed gaseous stream and absorbs acid gas contaminants such as hydrogen sulfide and carbon dioxide. The resultant "sweetened" gaseous stream is taken out from an overhead outlet of the separator scrubber column 76 in a separator scrubber overhead line 78, and a rich amine is taken out from the bottoms at a bottom outlet of the separator scrubber column in scrubber bottoms line 79. The rich amine stream may undergo regeneration to remove the hydrogen sulfide, for processing to generate elemental sulfur, and other gases and recycled back to the separator scrubbing column 76. The separator scrubbing column 76 may be operated with a gas inlet temperature between about 30° C. (86° F.) and about 66° C. (150° F.) and an overhead pressure of about 1.4 MPa (gauge) (200 psig) to about 3.1 MPa (gauge) (450 psig).

A scrubbed gaseous stream emerges from the scrubber via a separator scrubber overhead line 78 and may be passed to a hydrogen recovery unit 100 which may comprise a membrane for concentrating a hydrogen stream. In an aspect, the hydrogen recovery unit 100 comprises a pressure swing adsorption (PSA) unit 102. The PSA unit 102 comprises a plurality of adsorbent beds or vessels for hydrogen recovery. The PSA unit 102 may be in downstream communication with an overhead line of the separation section 30. For example, the PSA unit may be in downstream communication with the hot overhead line 34, the hot flash overhead line 46, the cold flash overhead line 52, the medium overhead line 62, the medium flash overhead line 68 and the medium knockout overhead line 77.

In the PSA unit 102, impure gases are adsorbed from hydrogen in the scrubbed medium gaseous stream and/or the scrubbed cold flash gaseous stream. In an embodiment, the hydrogen in the gaseous stream can be purified in a pressure swing adsorption (PSA) unit 102 shown in FIG. 2 to provide a hydrogen rich gaseous stream having a reduced concentration of hydrogen sulfide, ammonia, amines and hydrocarbons. The pressure swing adsorption process separates hydrogen from larger molecules in the scrubber overhead line 78. The larger impurities are adsorbed on an adsorbent at a high adsorption pressure while allowing passage of the smaller hydrogen molecules. Pressure reduction is effected to a lower desorption pressure to desorb the adsorbed larger species. It is generally desirable to employ the PSA process in multiple bed systems such as those described in U.S. Pat. No. 3,430,418, in which at least four adsorption beds are employed. The PSA process is carried out in such systems on a cyclical basis, employing a processing sequence.

Figure 2:
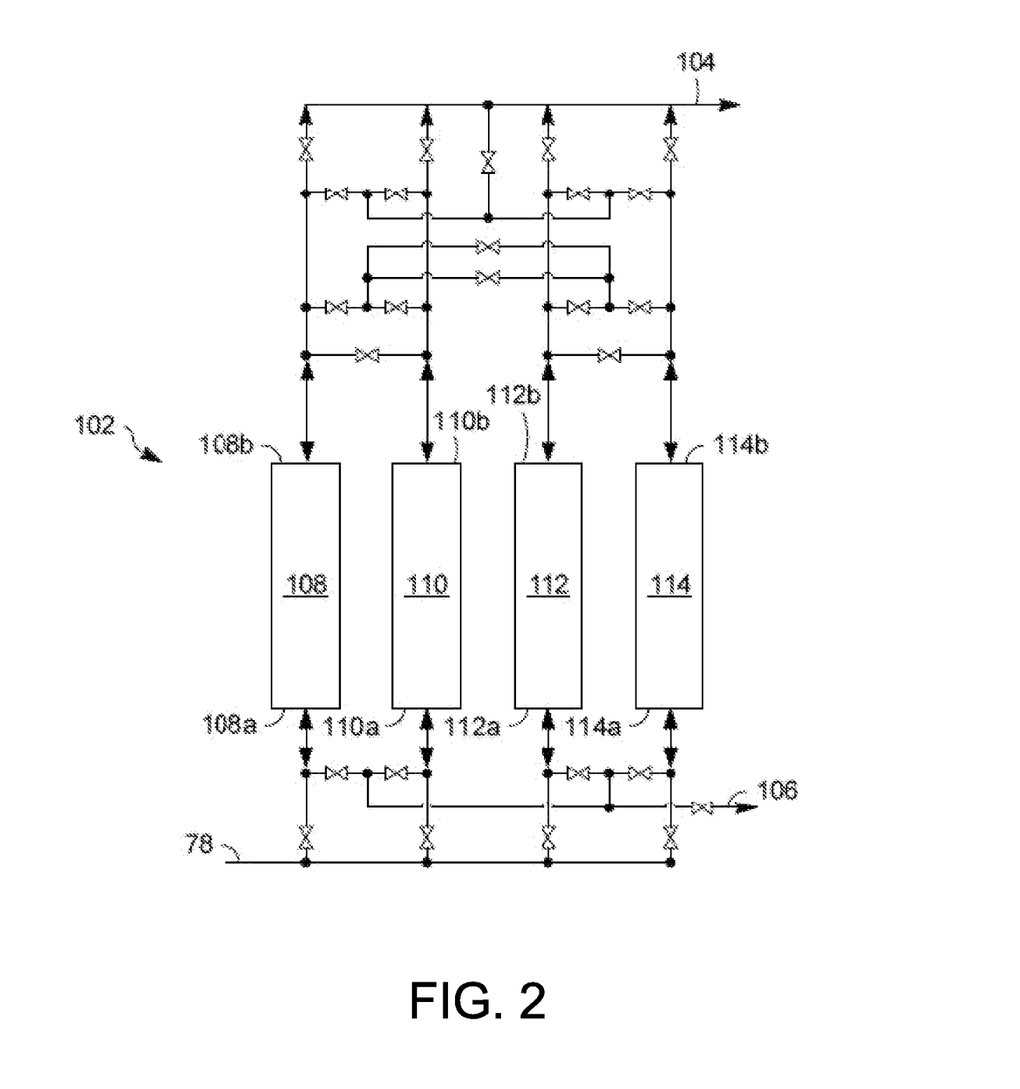
FIG. 2 is a further detail of a PSA unit of FIG. 1.

Referring to FIG. 2, the PSA unit 102 may have four beds 108-114 having inlet ends 108a-114a and outlet ends 108b-114b, respectively. In the first step, the scrubbed gaseous stream in the overhead line 78 is fed to an inlet end 108a of a first adsorbent bed 108 at high adsorption pressure such as about 1 MPa (150 psia) to about 1.7 MPa (250 psia) to adsorb adsorbable species onto the adsorbent with passage of purified product hydrogen gas to a discharge end 108b of the bed 108 for 5 to 10 minutes. A purified hydrogen stream may pass from the PSA unit 102 through product line 104 with a greater hydrogen purity than in the overhead line 78. Feed flow is terminated to the first bed 108 before the larger molecules break through to the discharge end 108b of the first bed. Second, the first bed 108 is cocurrently depressurized to an intermediate pressure such as about 0.7 MPa (100 psia) to about 1 MPa (150 psia) for 0.5 to 2 minutes by releasing void space gas from the discharge end 108b of the first bed to a discharge end 110b of a second bed 110 thereby repressurizing the second bed which has just been purged of desorbed larger molecules. Further cocurrent depressurization of the first bed 108 to a pressure of about 0.7 MPa (50 psia) to about 0.5 MPa (75 psia) can occur by releasing remaining void space gas to a discharge end 112b of a third bed 112 to purge the third bed of desorbed larger molecules for 5 to 10 minutes. In a third step, the inlet 108a to the first bed 108 is opened in a countercurrent depressurization or blow down step, in which gas departs the first bed through the inlet end 108a leaving the first bed 108 at sufficiently low pressure such as about 34.5 kPa (5 psia) to about 172 kPa (25 psia) to desorb adsorbed species from the adsorbent for about 0.5 to 2 minutes. Desorbed species are released through the inlet 108a and recovered in a tail gas line 106 with a greater concentration of adsorbable species than in the feed line 78. In a fourth step, void space gas from a fourth bed 114 may be released through a discharge end 114b thereof and fed through the discharge end 108b of the first bed 108 to purge out the desorbed species. In a last step, void space gas from the second bed 110 is fed from its discharge end 110b into the discharge end 108b of the first bed 108 to repressurize the first bed. Product gas from the discharge end 112b of the third bed 112 is then fed into the discharge end 108b of the first bed 108 to achieve adsorption pressure in the first bed 108 of about 1 MPa (150 psia) to about 1.7 MPa (250 psia) for 5 to 10 minutes. Since the first bed 108 is now at adsorption pressure, the cycle in the first bed begins anew. The same process sequence is operated with the other beds 110-114, with differences relating to the position of the bed 110-114 in the order.

A suitable adsorbent may be activated calcium zeolite A. Purified hydrogen with a hydrogen concentration greater and LPG concentration less than the gaseous stream in the scrubber overhead line 78, the medium knockout overhead line 77, the cold flash overhead line 52 and the joint line 82, can be transported in line 104 for recycle or transport to the hydrogen header for use anywhere in a refinery. The tail gas line 106 contains hydrocarbons with a reduced concentration of hydrogen and an increased concentration of LPG hydrocarbons relative to the concentration in the scrubber overhead line 78, the medium knockout overhead line 77, the cold flash overhead line 52 and the joint line 82. Because the tail gas stream in tail gas line 106 comprises substantial LPG hydrocarbons, it may be compressed in a tail gas compressor 142 and transported to an LPG recovery section 150.

The product recovery section 14 may include a stripping column 90 and a fractionation column 130. The stripping column 90 may be in downstream communication with a bottoms line in the separation section 30. For example, the stripping column 90 may be in downstream communication with the hot bottoms line 36, the hot flash bottoms line 48, the cold bottoms line 42, the cold flash bottoms line 54, the medium bottoms line 64 and the medium flash bottom line 70. In an aspect, the stripping column 90 may comprise a cold stripping column 92 and a hot stripping column 94. The cold stripping column 92 may be in downstream communication with the hydroprocessing reactor 24, the cold bottoms line 42 and, in an aspect, the cold flash bottoms line 54 for stripping a cold hydroprocessing effluent stream. The hot stripping column 94 may be in downstream communication with the hydroprocessing reactor 24 and the hot bottoms line 36 and, in an aspect, the hot flash bottoms line 48 for stripping a hot hydroprocessing effluent stream which is hotter than the cold hydroprocessing effluent stream. In an aspect, the cold hydroprocessing effluent stream may be the cold flash liquid stream in the cold flash bottoms line 54 which may be mixed with the medium flash liquid stream in medium flash bottoms line 70. The hot hydroprocessing effluent stream may be the hot flash liquid stream in hot flash bottoms line 48. In an aspect, the hot hydroprocessed effluent may be the medium liquid stream in medium bottoms line 64. The hot hydroprocessing effluent stream is hotter than the cold hydroprocessing effluent stream, by at least 25° C. and preferably at least 50° C.

The cold hydroprocessing effluent stream which in an aspect may be in the mixed line 74 may be heated and fed to the cold stripping column 92 at an inlet which may be in the top half of the column. The cold hydroprocessing effluent stream which comprises at least a portion of the liquid hydroprocessing effluent may be stripped in the cold stripping column 92 with a cold stripping media which is an inert gas such as steam from a cold stripping media line 96 to provide a cold vapor stream of naphtha, hydrogen, hydrogen sulfide, steam and other gases in an overhead line 120. At least a portion of the cold vapor stream may be condensed and separated in a receiver 122. A stripper net overhead line 124 from the receiver 122 carries a stripper off gas stream for further treating. Unstabilized liquid naphtha from the bottoms of the receiver 122 may be split between a reflux portion refluxed to the top of the cold stripping column 92 and a stripper overhead liquid stream which may be transported in a stripper receiver bottoms line 126 to further naphtha, LPG and hydrogen recovery. A sour water stream (not shown) may be collected from a boot of the overhead receiver 122.

The cold stripping column 92 may be operated with a bottoms temperature between about 149° C. (300° F.) and about 288° C. (550° F.), preferably about 260° C. (500° F.), and an overhead pressure of about 0.35 MPa (gauge) (50 psig), preferably about 0.70 MPa (gauge) (100 psig), to about 2.0 MPa (gauge) (290 psig). The temperature in the overhead receiver 122 ranges from about 38° C. (100° F.) to about 66° C. (150° F.) and the pressure is essentially the same as in the overhead of the cold stripping column 92.

The cold stripped stream in a bottoms line 128 may comprise predominantly naphtha and kerosene boiling materials. Consequently, the cold stripped stream in cold stripped bottoms line 128 may be heated and fed to a fractionation column 130. The fractionation column 130 is in downstream communication with the cold stripped bottoms line 128 of the cold stripping column 92. In an aspect, the product fractionation column 130 may comprise more than one fractionation column.

The hot flash liquid stream which may be in the hot flash bottoms line 48 may be fed to the hot stripping column 94 near the top thereof. In an aspect, the hot flash liquid stream may be separated in the medium pressure separator 60 and the medium liquid stream in medium bottoms line 64 may be fed to the hot stripper column 94. The hot flash liquid stream or the medium liquid stream may be stripped in the hot stripping column 94 with a hot stripping media which is an inert gas such as steam from a line 98 to provide a hot stripper gas stream of naphtha, hydrogen, hydrogen sulfide, steam and other gases in a hot stripper overhead line 118. The overhead line 118 may be condensed and a portion refluxed to the hot stripping column 94. However, in the embodiment of FIG. 1, the hot stripper gas stream in the overhead line 118 from the overhead of the hot stripping column 94 may be fed into the cold stripping column 92 directly in an aspect without first condensing or refluxing. The inlet for the cold hydroprocessing effluent stream may be at a higher elevation than the inlet for the overhead line 118. The hot stripping column 94 may be operated with a bottoms temperature between about 160° C. (320° F.) and about 360° C. (680° F.) and an overhead pressure of about 0.35 MPa (gauge) (50 psig), preferably about 0.70 MPa (gauge) (100 psig), to about 2.0 MPa (gauge) (292 psig).

A hydroprocessed hot stripped stream is produced in a hot stripped bottoms line 146. At least a portion of the hot stripped bottoms stream in the hot stripped bottoms line 146 may be heated and fed to the product fractionation column 130. Consequently, the product fractionation column 130 may be in downstream communication with the hot stripped bottoms line 146 of the hot stripping column 94 and the hot stripping column 94. The hot stripped stream in line 146 is at a hotter temperature than the cold stripped stream in line 128.

The product fractionation column 130 may be in downstream communication with the cold stripping column 92 and the hot stripping column 94 and may comprise more than one fractionation column for separating stripped streams into product streams. The product fractionation column 130 may strip the cold stripped stream and the hot stripped stream with inert stripping media such as steam from line 132 to provide several product streams. The product streams from the product fractionation column 130 may include an overhead light naphtha stream in a net overhead line 144, a heavy naphtha stream in line 136 from a side cut outlet, a kerosene stream carried in line 138 from a side cut outlet and a diesel stream from a side outlet 140. An unconverted oil stream may be provided in a bottoms line 142 which may be recycled to the hydroprocessing reactor 24. Heat may be removed from the fractionation column 130 by cooling at least a portion of the product streams and sending a portion of each cooled stream back to the fractionation column. These product streams may also be stripped to remove light materials to meet product purity requirements. The overhead naphtha stream in line 134 may be condensed and separated in a receiver with a portion of the liquid being refluxed back to the fractionation column 130. The net light naphtha stream in line 144 may be further processed before blending in a gasoline pool. The product fractionation column 130 may be operated with a bottoms temperature between about 260° C. (500° F.), and about 385° C. (725° F.), preferably at no more than about 350° C. (650° F.), and at an overhead pressure between about 7 kPa (gauge) (1 psig) and about 69 kPa (gauge) (10 psig). A portion of the unconverted oil stream in the bottoms line 142 may be reboiled and returned to the product fractionation column 130 instead of adding an inert stream such as steam to heat to the fractionation column 130.

The LPG recovery section 150 may comprise a stripper scrubber column 160, a sponge absorber column 170, an optional deethanizer column 180 and a debutanizer column 190. The net stripper off gas stream in the net stripper overhead line 124 rich in LPG gas may be routed to a stripper scrubber column 160 before it is transported to the sponge absorber column 170. The sponge absorber column 170 may be in downstream communication with the overhead line 120 of the stripper column 90. The stripper overhead liquid stream transported in a stripper receiver bottoms line 126 may be routed to an inlet of the deethanizer column 180. In the stripper scrubber column 160, the stripper off gas stream enters the stripper scrubber column at an inlet near a bottom and flows upwardly, while a lean amine stream in solvent line 162 enters the stripper scrubber column at an inlet near a top and flows downwardly. In an aspect, a deethanizer gas stream in line 186 may be scrubbed along with the stripper off gas stream. Hence, the deethanizer gas stream in line 186 may be added to the net stripper off gas stream in the net stripper overhead line 124 before entering the stripper scrubber column together in line 129. Preferred lean amines include alkanolamines DEA, MEA, and MDEA. Other amines can be used in place of or in addition to the preferred amines. The lean amine contacts the stripper off gas stream and absorbs acid gas contaminants such as hydrogen sulfide and carbon dioxide. The resultant "sweetened" stripper off gas stream is taken out from an overhead outlet of the stripper scrubber column in a stripper scrubber overhead line 164, and a rich amine is taken out from the bottoms at a bottom outlet of the stripper scrubber column in scrubber bottoms line 166. The rich amine may undergo regeneration to remove the hydrogen sulfide for processing to generate elemental sulfur. The stripper scrubbing column 160 may be operated with a gas inlet temperature between about 30° C. (86° F.) and about 66° C. (150° F.) and an overhead pressure of about 0.35 MPa (gauge) (50 psig) to about 1.7 MPa (gauge) (250 psig).

The sweetened stripper off gas stream comprising LPG hydrocarbons and some naphtha may be transported to the sponge absorber column 170 to recover LPG and naphtha hydrocarbons. Recovery of LPG hydrocarbons is improved in the sponge absorber 170 because hydrogen removed in the medium separator 60 and the medium flash drum 66 is not present in the sweetened stripper off gas stream in stripper scrubber overhead line 164, which would otherwise reduce LPG absorption into the sponge oil.

The multi-tray sponge absorber column 170 may include a first inlet 164i at a tray location near a bottom of the sponge absorber column 170. The sponge absorber 170 receives the sweetened stripper off gas from the stripper scrubber overhead line 164 at the first inlet 164i. The sponge absorber column 170 may include a second inlet 106i at a tray location near a middle of the sponge absorber column 170 which is at an elevation that is above the first inlet 164i. The sponge absorber column 170 receives the compressed tail gas in the tail gas line 106 from the PSA unit 102 at the second inlet 106i. The sponge absorber column 170 may be in downstream communication with the PSA unit 102. A lean sponge oil stream is fed into the sponge absorber column 170 through a lean sponge oil line 172 which may be a naphtha hydrocarbon stream such as from a debutanizer bottoms stream or a stream from a naphtha splitter column (not shown) which would be in downstream communication with the debutanizer bottoms line 194 carrying the debutanizer bottom stream. In the sponge absorber 170, the lean sponge oil and the sweetened stripper off gas stream are counter currently contacted. The sponge oil absorbs, extracts, and separates hydrocarbons from the stripper off gas stream. Moreover, in the sponge absorber 170, the lean sponge oil and the tail gas stream are counter currently contacted, and the sponge oil absorbs, extracts, and separates hydrocarbons from the tail gas stream. The hydrocarbons absorbed by the sponge oil include a substantial amount of methane and ethane and most of the LPG, $C_3$ and $C_4$, hydrocarbons and the $C_5$, and $C_{6+}$ light naphtha hydrocarbons in the tail gas stream and/or the stripper off gas stream. The sponge absorber 170 operates at a temperature of about 34° C. (93° F.) to 60° C. (140° F.) and a pressure essentially the same as the overhead receiver 122 stripper column 90 less frictional losses. A sponge absorption off gas stream is withdrawn from a top of the sponge absorber column 170 at an overhead outlet through a sponge absorber overhead line 174. A rich absorbent stream rich in LPG and naphtha hydrocarbons is withdrawn in a sponge absorber bottoms line 176 from a bottom of the sponge absorber column 170 at a bottoms outlet.

A portion of the sponge absorption off gas stream in the sponge absorber overhead line 174 may be transported to the hydrogen recovery unit 100 for hydrogen recovery. A sponge absorption off gas recovery stream in off gas recovery line 200 may be split from sponge absorption off gas purge line 202 and transported to the hydrogen recovery unit 100. In an aspect, the sponge absorption off gas stream may be compressed in a sponge absorber compressor 204 up to about 1.4 MPa (gauge) (200 psig) to about 3.1 MPa (gauge) (450 psig). The compressed, sweetened sponge absorption off gas stream may be fed from the sponge absorption off gas compressor 204 in a compressor line 201 to a sponge knock out drum 203 to remove a compressed, condensed stream in a knockout bottoms line 207 for transport to the stripper column 90. The sponge knock out drum 203 may be in downstream communication with the sponge absorption off gas compressor 204. The bottoms line 207 may transport the compressed, condensed stream to the mixed line 74. The compressed, condensed stream in the knock out bottoms line 207, the cold flash liquid stream in cold flash bottoms line 54 and the medium flash liquid stream in medium flash bottoms line 70, which may include the medium knockout liquid stream from the medium knockout bottoms line 73, may mix together in the mixed line 74 and be transported to the cold stripper column 92. The remaining compressed, sweetened stripper off gas may be transported from the sponge knock out drum 202 to the hydrogen recovery unit 100 in a sponge hydrogen recovery feed line 208 which may be an overhead line from the sponge knock out drum 203. The sponge absorber compressor 204 may be in downstream communication with the sponge absorber overhead line 174. The sponge absorption off gas in purge line 202 may be treated and routed to the refinery fuel gas system.

In the hydrogen recovery unit 100, the sponge absorption off gas stream in the sponge hydrogen recovery feed line 208 may be fed to the PSA unit 102 in which impurities are adsorbed from hydrogen in a portion of the sponge absorption off gas of the sponge absorption off gas recovery stream to provide the tail gas stream in tail gas line 106 and the purified hydrogen stream in product line 104 with a greater hydrogen purity than in the sponge absorber off gas stream in the sponge absorber overhead line 174 and the sponge hydrogen recovery feed line 208. The PSA unit 102 is in downstream communication with the sponge absorber overhead line 174. Additionally, the PSA unit 102 may be in downstream communication with the sponge absorber compressor 204.

In an aspect, the PSA unit 102 adsorbs impurities from hydrogen in the sponge hydrogen recovery feed line 208 and the scrubbed medium gaseous stream and/or the scrubbed cold flash gaseous stream in the separator scrubber overhead line 78. In an aspect, the scrubbed medium gaseous stream and/or the scrubbed cold flash gaseous stream in the separator scrubber overhead line 78 and the sponge absorber off gas recovery stream in the sponge hydrogen recovery feed line 208 may be combined in a common off gas line 206 and fed to the PSA unit together.

The LPG-rich absorbent stream in the sponge absorber bottoms line 176 may be fractionated to provide a hydrocarbon stream. The absorbent stream may be routed to an optional deethanizer column 180 to fractionate the absorbent stream and separate a $C_{2-}$ stream from a $C_{3+}$ hydrocarbon stream. Additionally, the net stripper overhead liquid stream in the stripper receiver bottoms line 126 also has substantial LPG hydrocarbons. Hence, the stripper overhead liquid stream in the stripper receiver bottoms line 126 may also be transported to the deethanizer column 180 to fractionate a $C_{2-}$ stream from a $C_{3+}$ hydrocarbon stream. In an aspect, the stripper overhead liquid stream in the stripper receiver bottoms line 126 may be combined with the rich absorbent stream and transported together to the deethanizer column 180 in a combined line 178. A deethanizer overhead stream may be partially condensed and separated in an overhead receiver into a deethanizer liquid stream for reflux to the column and a deethanizer gas stream in the deethanizer net overhead line 186. The deethanizer gas stream may be recycled to the stripper scrubber column 160 perhaps after mixing with the stripper off gas stream in the stripper net overhead line 124 and then routed to the stripper scrubber column 160 via line 129. An ethane stream can be condensed and recovered from a deethanizer overhead receiver if desired by using cryogenic equipment. A deethanized bottoms stream may be withdrawn from a bottom of the deethanizer column 180. A portion of the deethanized bottoms stream may be reboiled and sent back to the deethanizer column while a net deethanized bottoms stream comprising $C_{3+}$ hydrocarbons and concentrated in LPG and naphtha hydrocarbons is withdrawn in net deethanizer bottoms line 188. The net deethanizer bottoms stream may be transported to the debutanizer column 190. The deethanizer column 180 may be operated with a bottoms temperature between about 160° C. (320° F.) and about 200° C. (392° F.) and an overhead pressure of about 1 MPa (gauge) (150 psig) to about 2 MPa (gauge) (300 psig).

The debutanizer column 190 may fractionate the net deethanized bottoms stream in the net deethanized bottoms line 188 into an overhead stream comprising LPG product and a debutanized bottoms stream comprising naphtha. The debutanizer overhead stream may be condensed and a condensed stream from a debutanizer overhead receiver bottoms may be split between a reflux stream refluxed to the debutanizer column and a LPG product stream that may be recovered in LPG product line 192 or further processed such as in a caustic treatment process to remove sulfur compounds from the LPG product stream. If the deethanizer column 180 is omitted, an uncondensed net gas stream can be taken from a debutanizer overhead receiver overhead and routed to the stripper scrubber column 160. A debutanized bottoms stream may comprise a full range naphtha product stream. A portion of the debutanized bottoms stream may be reboiled and returned to the debutanizer column 190. Another portion of the debutanized bottoms stream may be recycled as the lean sponge oil hydrocarbon stream in sponge oil line 172 or further fractionated in a naphtha splitter (not shown). A further portion of the debutanized bottoms stream may be recovered as a naphtha product stream in the debutanizer bottoms line 194 which may be further processed to improve its value or taken as a fuel product as is. The debutanizer column 190 may be operated with a bottoms temperature between about 180° C. (356° F.) and about 220° C. (430° F.) and an overhead pressure of about 0.8 MPa (gauge) (120 psig) to about 1.7 MPa (gauge) (250 psig).

Figure 3:
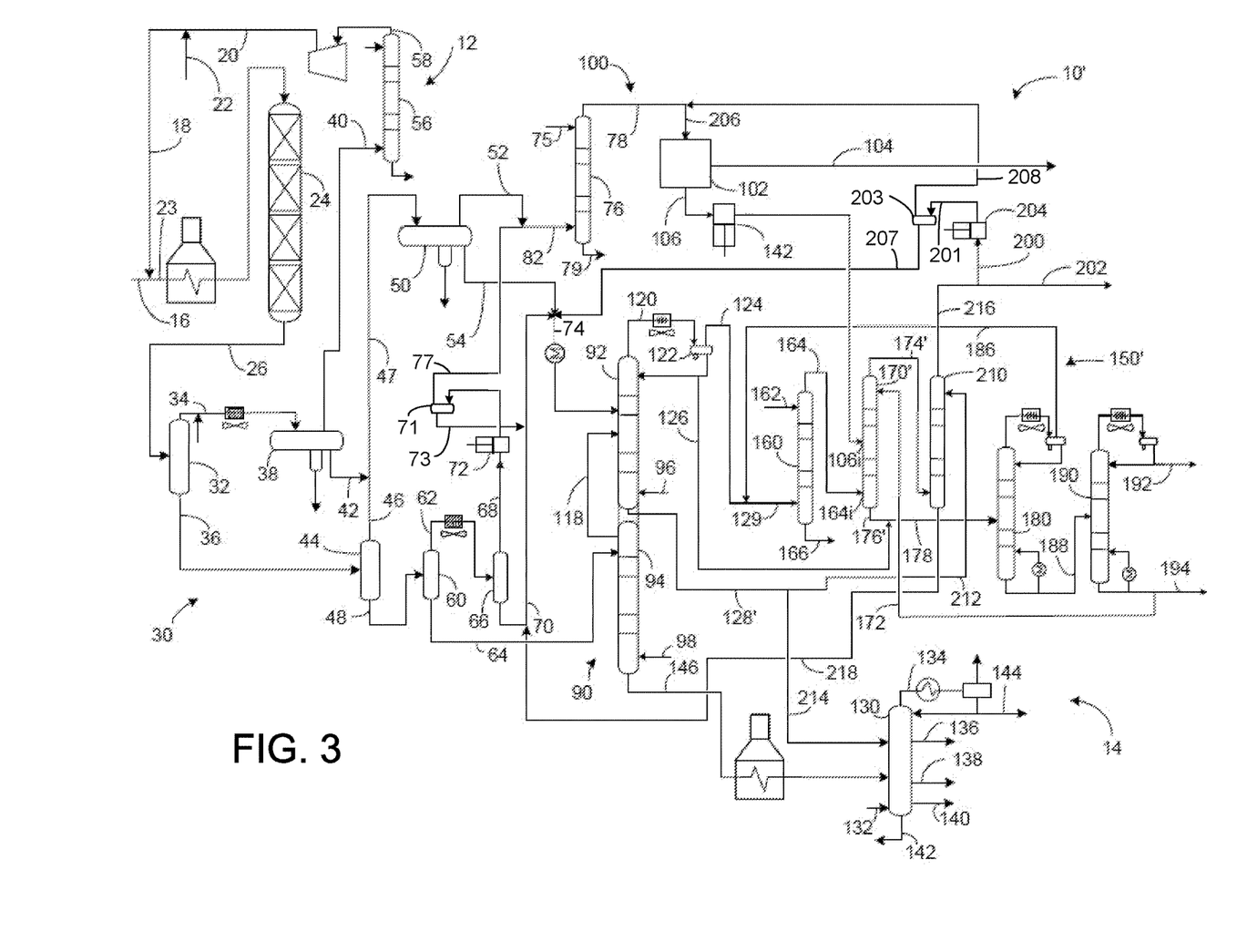
FIG. 3 is an additional embodiment of the process flow diagram of FIG. 1.

FIG. 3 shows an embodiment of an apparatus and process 10' which utilized dual sponge absorbers 170' and 210 for recovering even further LPG and naphtha hydrocarbons. Elements in FIG. 3 with the same configuration as in FIG. 1 will have the same reference numeral as in FIG. 1. Elements in FIG. 3 which have a different configuration than the corresponding element in FIG. 1 will have the same reference numeral but designated with a prime symbol ('). The configuration and operation of the embodiment of FIG. 3 is essentially the same as in FIG. 1 with the noted exceptions. In the embodiment of FIG. 3, the medium pressure separator 60 and the medium flash drum 66 can be omitted. In such an embodiment, the hot flash bottoms line 48 would deliver the hot flash liquid stream to the hot stripper column 94, the cold flash bottoms line 54 would deliver the cold flash liquid stream to the cold stripper column 92 and the cold flash overhead line 52 would deliver the cold flash gaseous stream to the hydrogen recovery unit 100. The stripper column 90 may be operated as previously explained as a single column or as a cold stripper column 92 and a hot stripper column 94. The LPG recovery section 150' may comprise a stripper scrubber column 160, a first sponge absorber column 170', a second sponge absorber column 210, an optional deethanizer column 180 and a debutanizer column 190. The stripper off gas stream in the net stripper overhead line 124 rich in LPG and naphtha may be routed to the stripper scrubber column 160 before it is transported to the first sponge absorber column 170'. The first sponge absorber column 170' may be in downstream communication with the overhead line 120 of the stripper 90. The stripper overhead liquid stream transported in a stripper receiver bottoms line 126 may be routed to an inlet of the deethanizer column 180.

In the stripper scrubber column 160, the stripper off gas stream enters the stripper scrubber column at an inlet near a bottom and flows upwardly, while a lean amine stream in solvent line 162 enters the scrubber at an inlet near a top and flows downwardly. In an aspect, a gas stream in line 186 may be scrubbed along with the stripper off gas stream. Hence, the gas stream in line 186 may be added to the stripper off gas stream in line 124 before entering the stripper scrubber together in line 129. Preferred lean amines include alkanolamines DEA, MEA, and MDEA. Other amines can be used in place of or in addition to the preferred amines. The lean amine contacts the stripper off gas stream and absorbs acid gas contaminants such as hydrogen sulfide and carbon dioxide. The resultant "sweetened" stripper off gas stream is taken out from an overhead outlet of the stripper scrubber column 160 in a stripper scrubber overhead line 164, and a rich amine is taken out from the bottoms at a bottom outlet of the stripper scrubber column in scrubber bottoms line 166. The rich amine may undergo regeneration to remove the hydrogen sulfide for processing to generate elemental sulfur. The sweetened stripper off gas stream comprising LPG hydrocarbons and some naphtha may be transported to the first sponge absorber 170' to recover LPG and naphtha hydrocarbons.

The multi-tray first sponge absorber column 170' may include a first inlet 164i at a tray location near a bottom of the first sponge absorber column 170'. The first sponge absorber column 170' receives the sweetened stripper off gas from the stripper scrubber overhead line 164 at the first inlet 164i. The first sponge absorber column 170' may include a second inlet 106i at a tray location near a middle of the first sponge absorber column 170' which is at an elevation that is above the first inlet 164i. The first sponge absorber column 170' may receive the compressed tail gas in the tail gas line 106 from the PSA unit 102 at the second inlet 106i. The first sponge absorber column 170' may be in downstream communication with the PSA unit 102. A lean sponge oil stream is fed into the first sponge absorber column 170' through a lean sponge oil line 172 which may be a naphtha hydrocarbon stream such as from a debutanizer bottoms stream or a stream from a naphtha splitter column (not shown) which would be in downstream communication with the debutanizer bottoms line 194 carrying the debutanizer bottom stream. In the first sponge absorber column 170', the lean sponge oil stream and the sweetened stripper off gas stream are counter currently contacted with each other. The sponge oil absorbs, extracts, and separates hydrocarbons from the stripper off gas stream. Moreover, in the sponge absorber 170', the lean sponge oil and the tail gas stream may be counter currently contacted, and the sponge oil absorbs, extracts, and separates hydrocarbons from the tail gas stream. The hydrocarbons absorbed by the sponge oil include a substantial amount of methane and ethane and most of the LPG, $C_3$ and $C_4$, hydrocarbons and the $C_5$, and $C_{6+}$ light naphtha hydrocarbons in the tail gas stream and/or the stripper off gas stream. The first sponge absorber 170' operates at a temperature of about 34° C. (93° F.) to 60° C. (140° F.) and a pressure essentially the same as the stripper column receiver 122 less frictional losses. A first sponge absorption stream is withdrawn from a top of the first sponge absorber column 170' at an overhead outlet through a first sponge absorber overhead line 174'. A first absorbent stream rich in LPG hydrocarbons is withdrawn in a first sponge absorber bottoms line 176' from a bottom of the sponge absorber column 170' at a bottoms outlet.

The LPG-rich absorbent stream in the first sponge absorber bottoms line 176' may be fractionated to provide a naphtha hydrocarbon stream and an LPG product stream. The absorbent stream is routed to an optional deethanizer column 180, which is a fractionation column, to fractionate the absorbent stream and separate a $C_{2-}$ stream from a $C_{3+}$ hydrocarbon stream. In an aspect, the first sponge absorber bottoms line bypasses the second sponge absorber 210 and transports the first absorbent stream to an optional deethanizer column 180 which is in direct, downstream communication with the first sponge absorber bottoms line 176'. The deethanizer fractionation column 180 may be in downstream communication with the first sponge absorber column 170'. The stripper overhead liquid stream in the stripper receiver bottoms line 126 may also be transported to an optional deethanizer column 180 to fractionate a $C_{2-}$ stream from a $C_{3+}$ hydrocarbon stream. In an aspect, the stripper overhead liquid stream in the stripper receiver bottoms line 126 may be combined with the first absorbent stream and transported together to the deethanizer column 180 in a combined line 178 while bypassing the second sponge absorber column 210. A deethanizer overhead stream may be partially condensed and separated in an overhead receiver into a deethanizer liquid stream for reflux to the column and the deethanizer gas stream in the deethanizer net overhead line 186. The deethanizer gas stream may be recycled to the stripper scrubber column 160 perhaps after mixing with the stripper off gas stream in net overhead line 124 and then routed to the stripper scrubber via line 129. If desired, an ethane stream can be condensed and recovered by using cryogenic equipment. A deethanized bottoms stream may be withdrawn from a bottom of the deethanizer column 180. A portion of the deethanized bottoms stream may be reboiled and sent back to the deethanizer column while a net deethanized bottoms stream comprising $C_{3+}$ hydrocarbons and concentrated in LPG hydrocarbons is withdrawn in net deethanizer bottoms line 188. The net deethanized bottoms stream may be transported to the debutanizer column 190.

The debutanizer column 190 may fractionate the net deethanized bottoms stream in the net deethanized bottoms line 188 into an overhead stream comprising LPG product and a debutanized hydrocarbon stream comprising naphtha in the debutanizer bottoms line 194. The debutanizer overhead stream may be totally condensed and a condensed stream from a debutanizer overhead receiver bottoms may be may be split between a reflux stream refluxed to the debutanizer column and a LPG product stream that may be recovered in LPG product line 192 or further processed such as in a caustic treatment process to remove sulfur compounds from the LPG product stream. If the deethanizer column 180 is omitted, an uncondensed net gas stream can be taken from a debutanizer overhead receiver overhead and routed to the stripper scrubber column 160. The debutanized bottoms stream comprises a light naphtha product stream. A portion of the debutanized hydrocarbon stream may be reboiled and returned to the debutanizer column 190. Another portion of the debutanized bottoms stream may be recycled as the lean sponge oil hydrocarbon stream in sponge oil line 172 to the first sponge absorber column 170' or further fractionated in a naphtha splitter (not shown). The first absorber column 170' may be in downstream communication with the deethanizer column 180 and the debutanizer column 190, which are fractionation columns. A further portion of the debutanized bottoms stream may be recovered as a light naphtha product stream in the debutanizer bottoms line 194 which may be further processed to improve its value or taken as a fuel product as is.

We have found that the first sponge absorption stream in the first sponge absorber overhead line 174' still has LPG and naphtha that can be recovered, so it may be transported to the second sponge absorber column 210 to absorb additional LPG and naphtha from the gaseous first sponge absorption stream. The multi-tray second sponge absorber column 210 may include an inlet at a tray location near a bottom of the second sponge absorber column 210 to receive first sponge absorption stream from the first sponge absorber column 170'. The second sponge absorber column 210 may be in downstream communication with the first sponge absorber overhead line 174' and an overhead line 120 of the stripper column 90. A second lean sponge oil stream is fed into the second sponge absorber column 210 through a second lean sponge oil line 212.

In order to improve the recovery of naphtha, a portion of the cold stripped stream in the cold stripper bottoms line 128' may be split into a cold stripper fractionation stream in cold fractionation feed line 214 and the second lean sponge oil stream in the second lean sponge oil line 212 and transported to the second sponge absorber column 210. The second sponge absorber column 210 is in downstream communication with the cold stripper bottoms line 128'. In the second sponge absorber column 210, the second lean sponge oil stream and the first sponge absorption stream are counter currently contacted with each other. The second sponge oil stream comprising a portion of the cold stripped stream absorbs, extracts, and separates hydrocarbons from the first sponge absorption stream. The hydrocarbons absorbed by the sponge oil include a substantial amount of methane and ethane and most of the LPG, $C_3$ and $C_4$, hydrocarbons and light naphtha range hydrocarbons, $C_5$ and $C_{6+}$, in the first sponge absorption stream absorbed from the tail gas stream and/or the stripper off gas stream. The second sponge absorber 210 operates at a temperature of about 34° C. (93° F.) to 60° C. (140° F.) and a pressure essentially the same as the stripper column receiver 122 less frictional losses. A second sponge absorption off gas stream is withdrawn from a top of the second sponge absorber column 210 at an overhead outlet through a second sponge absorber overhead line 216. A second rich sponge oil stream rich in LPG and naphtha hydrocarbons is withdrawn in a second sponge absorber bottoms line 218 from a bottom of the sponge absorber column 210 at a bottoms outlet.

A portion of the second sponge absorption off gas stream in the second sponge absorber overhead line 216 may be transported to the hydrogen recovery unit 100 for hydrogen recovery. A sponge absorption off gas recovery stream in off gas recovery line 200 may be split from sponge absorption off gas purge line 202 and transported to the hydrogen recovery unit 100 as described with respect to FIG. 1. In an aspect, the sponge absorption off gas stream in the second sponge absorber overhead line 216 may be compressed in a sponge absorber compressor 204 up to about 1.4 MPa (gauge) (200 psig) to about 3.1 MPa (gauge) (450 psig) and transported to the hydrogen recovery unit 100 after knock out of condensed materials. The sponge absorber compressor may be in downstream communication with the sponge absorber overhead line 174' and the second sponge absorber overhead line 216.

The LPG and naphtha-rich second absorbent stream in the second sponge absorber bottoms line 218 may be transported to the stripper column 90 to have gases stripped from the second rich absorbent stream. In an aspect, the second rich absorbent stream may be stripped in the cold stripper 92. In a further aspect, the second absorbent stream in the second absorbent bottoms line 218 may be combined with a medium flash liquid stream in a medium flash bottoms line 70 and transported to the cold stripper column 92. Specifically, the medium flash liquid stream and the second rich absorbent stream may be mixed with the cold flash liquid stream in the cold flash bottoms line 54 and transported to the cold stripper column in the mixed line 74. Alternatively, if no medium pressure separator 60 or medium pressure flash drum 66 are used, the second absorbent stream in sponge absorber bottoms line may be transported directly to the cold stripper column or mixed with the cold flash liquid stream in the cold separator bottoms line 54 and transported to the cold stripper in the mixed line 74. Other aspects of FIG. 3 are as described for FIG. 1. In the cold stripper column 92, the hydrocarbon rich second rich absorbent stream and the medium flash liquid stream are stripped of gases together.

EXAMPLES

We calculated the improvement in naphtha recovery obtained by using a portion of a cold stripped stream for absorbing LPG and naphtha in a second sponge absorber according to the embodiment of FIG. 3. By using the cold stripped stream to absorb LPG and naphtha from a first absorption stream, 13 wt % additional recovery of LPG and 2.2 wt % additional recovery of naphtha is obtained.

Specific Embodiments

While the following is described in conjunction with specific embodiments, it will be understood that this description is intended to illustrate and not limit the scope of the preceding description and the appended claims.

A first embodiment of the invention is a process for recovering hydrogen and hydrocarbons comprising adsorbing impurities from hydrogen in a gaseous stream to provide a hydrogen stream and a tail gas stream comprising hydrocarbons; absorbing LPG hydrocarbons from the tail gas stream to produce an absorbent stream and an absorption stream comprising LPG and hydrogen; and absorbing LPG hydrocarbons from the absorption stream to provide an absorption off-gas stream and a hydrocarbon-rich absorption stream. An embodiment of the invention is one, any or all of prior embodiments in this paragraph up through the first embodiment in this paragraph further comprising hydroprocessing a hydrocarbon feed stream in a hydroprocessing reactor to provide a hydroprocessing effluent stream; and separating the hydroprocessing effluent stream to provide the gaseous stream and a liquid stream. An embodiment of the invention is one, any or all of prior embodiments in this paragraph up through the first embodiment in this paragraph further comprising stripping the liquid stream to provide a stripped hydroprocessed stream and absorbing LPG hydrocarbons from the absorption stream by contact with the stripped hydroprocessed stream. An embodiment of the invention is one, any or all of prior embodiments in this paragraph up through the first embodiment in this paragraph wherein stripping the liquid stream further provides a stripper off-gas stream and absorbing hydrocarbons from the stripper off-gas stream and the tail gas stream. An embodiment of the invention is one, any or all of prior embodiments in this paragraph up through the first embodiment in this paragraph further comprising absorbing acid gases from the stripper off-gas stream before absorbing hydrocarbons from the stripper off-gas stream. An embodiment of the invention is one, any or all of prior embodiments in this paragraph up through the first embodiment in this paragraph further comprising fractionating the absorbent stream to provide a hydrocarbon stream and absorbing LPG hydrocarbons from the tail gas stream by contact with the hydrocarbon stream. An embodiment of the invention is one, any or all of prior embodiments in this paragraph up through the first embodiment in this paragraph further comprising compressing the absorption off-gas stream and adsorbing impurities from hydrogen in the absorption off-gas stream to provide a hydrogen stream and a tail gas stream comprising hydrocarbons. An embodiment of the invention is one, any or all of prior embodiments in this paragraph up through the first embodiment in this paragraph wherein stripping the liquid stream further provides an overhead stream, condensing the overhead stream to provide the stripper off-gas stream and an overhead liquid stream and combining the overhead liquid stream with the absorbent stream. An embodiment of the invention is one, any or all of prior embodiments in this paragraph up through the first embodiment in this paragraph further comprising stripping the hydrocarbon rich absorption stream along with the liquid stream.

A second embodiment of the invention is a process for recovering hydrogen and hydrocarbons comprising absorbing LPG hydrocarbons from a stripper off gas stream to produce an absorbent stream and an absorption stream comprising LPG and hydrogen; absorbing LPG hydrocarbons from the absorption stream to provide an absorption off-gas stream and a hydrocarbon-rich absorption stream; and adsorbing impurities from hydrogen in the absorption off-gas stream to provide a hydrogen stream and a tail gas stream comprising hydrocarbons. An embodiment of the invention is one, any or all of prior embodiments in this paragraph up through the second embodiment in this paragraph further comprising hydroprocessing a hydrocarbon feed stream in a hydroprocessing reactor to provide a hydroprocessing effluent stream; and separating the hydroprocessing effluent stream to provide a gaseous stream and a liquid stream. An embodiment of the invention is one, any or all of prior embodiments in this paragraph up through the second embodiment in this paragraph further comprising stripping the liquid stream to provide a stripped hydroprocessed stream and absorbing LPG hydrocarbons from the absorption stream by contact with the stripped hydroprocessed stream. An embodiment of the invention is one, any or all of prior embodiments in this paragraph up through the second embodiment in this paragraph further comprising absorbing acid gases from the stripper off-gas stream before absorbing hydrocarbons from the stripper off-gas stream. An embodiment of the invention is one, any or all of prior embodiments in this paragraph up through the second embodiment in this paragraph further comprising fractionating the absorbent stream to provide a hydrocarbon stream and absorbing LPG hydrocarbons from the stripper off gas stream by contact with the hydrocarbon stream. An embodiment of the invention is one, any or all of prior embodiments in this paragraph up through the second embodiment in this paragraph further comprising compressing the absorption off-gas stream and adsorbing impurities from hydrogen in the absorption off-gas stream to provide a hydrogen stream and a tail gas stream comprising hydrocarbons. An embodiment of the invention is one, any or all of prior embodiments in this paragraph up through the second embodiment in this paragraph wherein stripping the liquid stream further provides an overhead stream, condensing the overhead stream to provide the stripper off-gas stream and an overhead liquid stream and combining the overhead liquid stream with the absorbent stream. An embodiment of the invention is one, any or all of prior embodiments in this paragraph up through the second embodiment in this paragraph further comprising stripping the hydrocarbon rich absorption stream with the liquid stream.

A third embodiment of the invention is an apparatus comprising a first absorber in communication with an overhead line of a stripper; a second absorber in communication with an overhead line of the first absorber and a bottoms line of the stripper; and a fractionation column in downstream communication with the first absorber column via a bottoms line and first absorber column being in downstream communication with the fractionation column. An embodiment of the invention is one, any or all of prior embodiments in this paragraph up through the third embodiment in this paragraph wherein the bottoms line bypasses the second absorber. An embodiment of the invention is one, any or all of prior embodiments in this paragraph up through the third embodiment in this paragraph wherein the first absorber is in downstream communication with a PSA unit.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for recovering hydrogen and hydrocarbons comprising:
adsorbing impurities from hydrogen in a gaseous stream to provide a hydrogen stream and a tail gas stream comprising hydrocarbons;
absorbing LPG hydrocarbons from said tail gas stream to produce an absorbent stream and an absorption stream comprising LPG and hydrogen; and
absorbing LPG hydrocarbons from said absorption stream to provide an absorption off-gas stream and a hydrocarbon-rich absorption stream.

2. The process of claim 1 further comprising hydroprocessing a hydrocarbon feed stream in a hydroprocessing reactor to provide a hydroprocessing effluent stream; and separating said hydroprocessing effluent stream to provide said gaseous stream and a liquid stream.

3. The process of claim 2 further comprising stripping said liquid stream to provide a stripped hydroprocessed stream and absorbing LPG hydrocarbons from said absorption stream by contact with said stripped hydroprocessed stream.

4. The process of claim 3 wherein stripping said liquid stream further provides a stripper off-gas stream and absorbing hydrocarbons from said stripper off-gas stream and said tail gas stream.

5. The process of claim 4 further comprising absorbing acid gases from said stripper off-gas stream before absorbing hydrocarbons from said stripper off-gas stream.

6. The process of claim 1 further comprising fractionating said absorbent stream to provide a hydrocarbon stream and absorbing LPG hydrocarbons from said tail gas stream by contact with said hydrocarbon stream.

7. The process of claim 1 further comprising compressing said absorption off-gas stream and adsorbing impurities from hydrogen in said absorption off-gas stream to provide a hydrogen stream and a tail gas stream comprising hydrocarbons.

8. The process of claim 4 wherein stripping said liquid stream further provides an overhead stream, condensing said overhead stream to provide said stripper off-gas stream and an overhead liquid stream and combining said overhead liquid stream with said absorbent stream.

9. The process of claim 2 further comprising stripping said hydrocarbon rich absorption stream along with said liquid stream.

10. A process for recovering hydrogen and hydrocarbons comprising:
absorbing LPG hydrocarbons from a stripper off gas stream to produce an absorbent stream and an absorption stream comprising LPG and hydrogen;
absorbing LPG hydrocarbons from said absorption stream to provide an absorption off-gas stream and a hydrocarbon-rich absorption stream; and adsorbing impurities from hydrogen in said absorption off-gas stream to provide a hydrogen stream and a tail gas stream comprising hydrocarbons.

11. The process of claim 10 further comprising hydroprocessing a hydrocarbon feed stream in a hydroprocessing reactor to provide a hydroprocessing effluent stream; and separating said hydroprocessing effluent stream to provide a gaseous stream and a liquid stream.

12. The process of claim 11 further comprising stripping said liquid stream to provide a stripped hydroprocessed stream and absorbing LPG hydrocarbons from said absorption stream by contact with said stripped hydroprocessed stream.

13. The process of claim 12 further comprising absorbing acid gases from said stripper off-gas stream before absorbing hydrocarbons from said stripper off-gas stream.

14. The process of claim 10 further comprising fractionating said absorbent stream to provide a hydrocarbon stream and absorbing LPG hydrocarbons from said stripper off gas stream by contact with said hydrocarbon stream.

15. The process of claim 10 further comprising compressing said absorption off-gas stream and adsorbing impurities from hydrogen in said absorption off-gas stream to provide a hydrogen stream and a tail gas stream comprising hydrocarbons.

16. The process of claim 12 wherein stripping said liquid stream further provides an overhead stream, condensing said overhead stream to provide said stripper off-gas stream and an overhead liquid stream and combining said overhead liquid stream with said absorbent stream.

17. The process of claim 11 further comprising stripping said hydrocarbon rich absorption stream with said liquid stream.

18. An apparatus comprising:
a first absorber in communication with an overhead line of a stripper and in downstream communication with a PSA unit;
a second absorber in communication with an overhead line of said first absorber and a bottoms line of said stripper; and
a fractionation column in downstream communication with said first absorber column via a bottoms line and first absorber column being in downstream communication with the fractionation column.

19. The apparatus of claim 18 wherein said bottoms line bypasses said second absorber.

* * * * *